United States Patent [19]
Warner

[11] Patent Number: 5,484,550
[45] Date of Patent: Jan. 16, 1996

[54] MATERIALS EXHIBITING LARGE NON-LINEAR OPTICAL PROPERTIES

[75] Inventor: Mark Warner, Cambridge, England

[73] Assignee: Non-Linear Optics Limited, Jersey, Channel Islands

[21] Appl. No.: 202,547

[22] Filed: Feb. 28, 1994

Related U.S. Application Data

[63] Continuation-in-part of Ser. No. 689,797, May 21, 1991, abandoned.

[30] Foreign Application Priority Data

Nov. 26, 1988 [GB] United Kingdom .................. 8827664

[51] Int. Cl.$^6$ .................................................. C09K 19/52
[52] U.S. Cl. ........................ 252/299.01; 252/582; 428/1
[58] Field of Search .............................. 252/582, 299.01; 428/1

[56] References Cited

U.S. PATENT DOCUMENTS

| | | | |
|---|---|---|---|
| 4,694,066 | 9/1987 | DeMartino et al. | 252/299.01 |
| 4,779,961 | 10/1988 | DeMartino | 252/299.01 |
| 4,795,664 | 1/1989 | DeMartino | 252/299.01 |
| 4,810,338 | 3/1989 | DeMartino et al. | 252/299.01 |
| 4,835,235 | 5/1989 | DeMartino et al. | 252/299.01 |
| 4,851,502 | 7/1989 | DeMartino | 252/299.01 |
| 4,887,889 | 12/1989 | Leslie | 252/582 |
| 4,894,263 | 1/1990 | DuBois et al. | 252/299.01 |
| 5,002,361 | 3/1991 | DeMartino et al. | 252/582 |
| 5,011,623 | 4/1991 | Yoshinaga et al. | 252/299.01 |
| 5,026,147 | 6/1991 | Soane et al. | 252/582 |
| 5,037,582 | 8/1991 | Miyata et al. | 252/582 |
| 5,053,168 | 10/1991 | Man et al. | 252/299.01 |
| 5,080,764 | 1/1992 | Kester et al. | 252/582 |
| 5,098,975 | 3/1992 | Omelis et al. | 252/299.01 |
| 5,273,793 | 12/1993 | Kester et al. | 252/299.01 |

OTHER PUBLICATIONS

Levine et al., The Journal of Chemical Physics, vol. 65, No. 5, pp. 1989–1993, (1976).

J. M. F. Gunn and M. Warner, "Layer Hopping by Chains in Polymeric Smectics?", Physical Review Letters, vol. 56, No. 12, Mar. 24, 1986, pp. 1268–1271.

Blumenstein et al., "Influence of Molecular Weight on Phase Transition Entropies of a Thermotropic Nematic Polyester", Mol. Cryst. Lip. Cryst., vol. 82, pp. 205–213 (1982).

B. F. Levine et al., "Second order hyperpolarizability of a polypeptide α–helix Poly–γ–benzyl–L–glutamate". The Journal of Chemical Physics, vol. 65, No. 5, Sep. 1, 1976, pp. 1989–1993.

Primary Examiner—Philip Tucker
Attorney, Agent, or Firm—Oliff & Berridge

[57] ABSTRACT

A polymeric nomadic liquid crystal material has both a non-linear optical (NLO) response and also poling orderability, said material having semi-flexibility along the polymer backbone and stereo-regular, like-orientated incorporation in the polymer backbone of (a) a plurality of NLO elements and (b) dipolar elements, wherein the like orientation can be retained, and reversed by an applied poling field, by migration of dipole-reversing molecular defects along the backbone.

12 Claims, 1 Drawing Sheet

MATERIALS EXHIBITING LARGE NON-LINEAR OPTICAL PROPERTIES

This is a continuation-in-part of my earlier application Ser. No. 07/689,797, filed May 21, 1991 now abandoned, which in turn is the U.S. National Stage of PCT/GB89/01415 filed Nov. 24, 1989.

BACKGROUND OF THE INVENTION

1. Field of the Invention

This invention concerns material exhibiting large non-linear optical properties, and relates in particular to such materials that are in the form of flexible rod-like polymeric compounds.

2. Description of the Technology and its Application

Most common materials transparent to light, such as ordinary glass, have the property of bending, or deviating, the path of light as it passes into and out of the material across the interface between the material and the surrounding medium, a process known as refraction, and a measurement of the magnitude of this deviation is given by the material's refractive index. Most such materials have a refractive index which is a constant with the light level, but some exhibit rather strange behaviour when refracting light, in that the degree of deviation varies depending upon the intensity of the light. These latter materials are said to have a non-linear optical (NLO) response, also known as the $\chi^{(2)}$ response (the material being a $\chi^{(2)}$ material). In effect, for an NLO medium the refractive index increases with the light amplitude, so that a prism of such a material would refract an intense beam of light more than a weak one. The precise definition of $\chi^{(2)}$ is in the connection between induced polarisation P and the square of the field strength E, that is:

$$P = \chi^{(2)} E^2$$

(for simplicity, and because it adds little to the discussion in the present context of uniaxial media, the tensor character of this relationship is here ignored). Light is an electromagnetic wave, having an electric field component, and the reason that refractive effects, whether linear or non-linear, happen at all is connected with the manner in which the light's electric field interacts with the electrons in the chemical bonds of the very molecules of which the material is composed.

A number of NLO materials are well known, and have been prepared for use in various types of optical apparatus and equipment that have been designed to take advantage of their unusual behaviour. These optical devices exploiting NLO effects fall into three main categories, thus:

(1) Modulators, which superimpose a signal onto an optical carrier wave for communications purposes. The very high frequency of light means that an extremely large bandwidth is achievable, and this implies immense communications potential.

(2) Switches, which combine light beams, and in so doing change the beam's direction. These can be used for "chopping" a beam, or for combining beams in the logic gates of an optical computer (one that carries its signals in the form of light pulses rather than electronically).

(3) Frequency doublers, which provide an output signal of double the frequency of the input signal, and employ a combination of tuned and non-linear circuitry. These can be used, for example, to shift the output of a "red" laser to the blue end of the visible spectrum.

For the most part, devices such as these, relying for their operation on the NLO response of a unit made from a light-refracting transparent medium, are only truly feasible, and powerful, if firstly their switching of a beam—that is, establishing the NLO effect after exposure to light—is extremely fast, and secondly there is only a very low absorbsance of the light in traversing the NLO medium unit (in effect the switch or device generally); the thinner the layer of the NLO material in a device that the beam must traverse the less loss occurs, but equally the thinner the layer the more powerful must be the NLO response.

3. Description of the Prior Art and its Problems

The various NLO materials proposed so far have for the most part been inorganic, and these do not meet the criteria of speed and low loss. They are both slow to react and lossy; this is because their response to the electrical field of a light beam involves the relative movement of the ions from which they are made, and not only do ions have considerable inertia but they are closely coupled to their neighbors (hence the sluggishness and the losses). It has been suggested, however, that there could be utilised organic NLO media which rely for their effect on their molecules containing electron-donating and electron-accepting regions that readily exchange electrical charge when acted upon by an electrical field. Here it is the electronic transitions within the molecule that determine the NLO response, and not only is this mechanism lossless but in addition it is very much faster (about $10^4$ times) than that involved when using inorganics. The intrinsic response at the molecular level is known as "the $\beta$ value", and molecules with such a response are commonly colored (the selective absorption of some frequencies of light to give a material with a net color is connected with the ability of its bonding electrons to transfer along the molecule), and so will often be useful as dyes.

There are two main problems involved in the selection and/or design of dyes suitable for use in NLO effect materials. Firstly, there is a need to optimise the $\beta$ value of the dye molecule by selecting both the best electron Donor and Acceptor groups and their relative positions and connections within the molecule. Secondly, there is the need, for molecules with a given $\beta$ value, to optimise the organisation of all the individual dye molecules in the solid phase to maximize the NLO response of the dye medium as a whole. In connection with this latter point, the molecules must be so ordered—aligned—that there is a net number pointing in one direction. Put another way, there should be an imbalance between the number pointing "up" compared with the number pointing "down", and this should be as large as possible; the medium then lacks "centro-symmetry", or it can be said that "dipolar order" has been achieved. When this is achieved, a majority of Donor-Acceptor (hereinafter "D-A") pairs on different molecules will point in the game direction, and so will act coherently together when the electric field of a light wave is applied, and thus there is a large net NLO effect. When there is no such up/down imbalance, the overall effect is zero. Naturally, once the mobility of the dye molecules in the fluid has enabled an external agent to create the poling up/down imbalance, their subsequent immobility in the solid state should ensure that, once so ordered, they will remain so, and thus the NLO effect will persist.

For the organic NLO materials used or suggested for use, various ploys and techniques have been applied to deal with these problems, and much work has been carried out, especially in relation to creating the net balance. In principle, one way to create the desired imbalance between up and down molecules is by poling—that is, applying a static electric field to the molecules when they are in a fluid (generally liquid) form. The permanent molecular dipoles (often in fact associated with D-A pairs that cause the NLO response), and hence the molecules themselves, are then forced by the applied field into partial alignment therewith, creating the necessary up/down imbalance required for an NLO response. Then, fixing the molecules in this aligned order by cooling the whole until it becomes a solid (usually a glass), when molecular motion on a large scale ceases, makes the imbalance, and thus the NLO response persist even when the poling field is removed.

Poling is more effective if:

(1) the dipoles are larger (thus making the E field more effective);

(2) the molecular environment restricts angular freedom even when the material is in a "fluid" state, for then the poling field does not have to work against an unfettered tendency to disorder (and this restriction of freedom can be arranged by dispersing the dye molecules within a continuous phase that is nematia in character); and (3) the glassy (solid) phase is highly stable against subsequent re-organisation of the molecules, and thus against any loss of the dipolar order needed for the NLO response.

In the work done in this field these three steps have been investigated and applied many times, both separately and in various combinations. The present invention also combines them, but in a novel and highly effective way that significantly amplifies their mutual effect.

A summary of the previous work carried out with the above three possibilities (large dipoles, movement-restricting environment, and stable solid phase) is roughly as follows:

(1) One way of increasing the size of the effective dipole has been to polymerise a number of dipolar monomers in such a way that in the polymer all the individual dipoles are regularly aligned head-to-tail—that is, pointing in the same direction. A long polymeric rod-like molecule such as poly(γ-benzyl-L-glutamate), commonly known as PBLG, can have a huge overall dipole (since the dipole on each monomer happens to point along this particular molecular rod in the same sense). The measured NLO response of PBLG confirms this idea; see B. F. Levine and C. G. Bethod, J. Chem. Phys. 65, 1989 (1976), who show that the monomeric dipoles, in acting together in each polymer molecule, together couple strongly to the poling field; the up/down imbalance thus created is also that which allows the NLO elements, the "βs", to act coherently with each other. The NLO response is high in the sense that it is proportional to the degree of polymerisation (number of monomers per polymer) which can be a large number, 10–500 for instance. It is by this factor that the $\chi^{(2)}$ response is higher than that of conventional, monomeric materials. However, a serious problem with the use of such long, rigid rods, is that only in dilute solution do they have the freedom to move in response to the applied electric poling field ($E_{poling}$); in a concentrated solution, or in a melt, the molecules are so close one to another that they physically interfere with each other, causing the "log jams" that prevent their reorientation. Additionally, PBLG forms a nematic phase; nematic forces (known as the "nematic mean field" or simply the "nematic field" and deriving from the nematic potential felt by molecules in a nematic phase of a fluid) act on the molecules, and make the intermediate positions (across the field) between the down and up estate highly unfavourable, so slowing the transition from down to up (that is, the poling process itself). For these two reasons complete poling of a concentrated PBLG would take an impractically long time, possibly of the order of several years.

On the other hand, when dilute solutions are employed to render the poling times acceptably short, the optical density of the material—the number of NLO elements per volume—is far too low to be useful, and moreover such dilute solutions are not at all easy to form subsequently into stable, solid glasses in which the poling-attained order is fixed into place. In short, the use of rigid rod polymers, like PBLG, has no device potential.

(2) Although there are disadvantages (as just discussed) where there is employed a nematic phase NLO material, there can also be advantages. At the molecular level a nomadic fluid consists typically of rod-like molecules. In contrast to a conventional fluid, where the molecules are largely randomly arranged, nematics have their rods orientationally ordered, pointing on average up or down (in equal proportions). This ordered aspect, which is the orientational equivalent to the ordering of atoms or molecules in a conventional crystalline solid, gives the "crystal" part of the characterising name "Liquid crystal", but since the rods are positionally as disordered as the atoms or molecules in a true fluid a nematic will still flow—hence the "liquid" part. Polymer liquid crystals are materials where the basic monomer constituents are nematic-forming molecolar rods. They are linked together to form a much larger molecule— a polymer—though still with the propensity to orientational order.

Where there is employed an NLO material having a nematic phase, that phase results in the restriction of the angular freedom of the molecules to being more nearly up or down rather than simply randomly orientated. Thus, when the poling E field is switched on, its effect in creating imbalance is theoretically up to five times larger for a hemarid phase material than for a non-nematic phase material (in the latter the orientational disorder is much harder for the field to overcome). The maximum figure obtains when the nematic order is perfect, and the molecules can only be up or down.

Using a nematic phase means that "field annealing" is necessary—that is, the nematic phase must be subjected to AC or DC fields to remove the textures and defects in the nematic phase (the discontinuities mentioned above) that would otherwise cause loss of light by scattering.

(3) Polymers form easily the best glasses—that is, glasses with good mechanical and dielectric properties such as stability of molecular order, thin film and coating formation, and lack of brittleness.

The use of the first of these three features—a polymer containing numerous aligned dipoles—has been widely investigated, but because so far the materials have in practical terms been unpolable this approach has generally been abandoned. Most consideration is accordingly given to the other two features, where it has been felt in particular that combinations should be advantageous. For example, if a good glass-forming polymer can be made nematic rather than isotropic then poling is more effective, and if the NLO dye itself can be part of the polymer rather than being dissolved/dispersed in the polymer matrix then more can be put in, thus increasing the optical density (and the dye can then be made as immobile as the polymer itself in the glassy phase, another important advantage).

Much effort has been directed at designing polymer liquid crystals, PLCs, for use in the NLO field, which meet these two criteria (nematic and dye-inclusive). One approach has been to incorporate the dye molecules in a comb, or side-chain, polymer liquid crystal—that is, a polymer wherein the nematic portions (rods) are attached to the polymer backbone rather like the teeth of a comb are attached to the comb's spine. The teeth, whether they be true NLO elements or simply nematic-forming portions, are attached via semi-flexible (generally aliphatic) "spacers" or "hinges". Such PLCs are described by, for instance, Celanese (DeMartino et al) in their EPO Publications Nos. 230,898, 231,770 and 235,506, by Thomson-CSF (Le Barny et al) in their EPO Publication No. 244,288, and (assigned to Hoechst Celanese) by DeMartino in U.S. Pat. No. 4,779,961.

However, these strategies have been only moderately successful. Thus, the enhancement due to nematicity is at most a factor of 5 (and in practice it is very much less than this), and is nothing like the huge effect motivating the PBLG (rigid rod) method because the rods inside the chain polymer molecules are weakly coupled to each other. Moreover, as the teeth of a side-chain polymer, the dye molecules still have some limited freedom in the glassy state, where it is primarily the motion of the polymer backbone (the main chain) that has ceased. Thus, such side-chain polymers result in a decay of up/down imbalance that should be fixed in.

OBJECTS OF THE INVENTION

One object of the present invention is to overcome disadvantages of the prior art, including the significant problems with achieving both a really large NLO response and stability in the glass/solid employed in a device. A further object of the invention is to retain at least some of the huge enhancement demonstrated for rods whilst overcoming the slow poling associated with rods. Yet another object is to eliminate the problem of limited motion in the glass, leading to decay of the created dipolar order needed for the NLO response.

SUMMARY OF THE INVENTION

The instant invention is based on requiring a coherency of dipole attachment within the polymer (as in the PBLG case) and also a strong nematic phase to force large parts of the polymer to dot in concert to get the large response, and also by requiring the use of semi-flexible, main-chain PLC molecules so as to get a mechanism by which there can take place a relatively rapid reorientation in the poling field.

In one aspect, therefore, the invention provides a polymeric material liquid crystal having both a non-linear (NLO) response and also polling orderability, by virtue of the incorporation thereinto of, respectively, a plurality of NLO elements and monomers that have a dipolar nature, wherein an especially high NLO response is achieved by the material being a nematic polymer liquid crystal with semi-flexibility along its backbone and stereo-regular, like-orientated incorporation in the polymer of the NLO elements and also of the dipolar elements.

A material according to the invention combines all the advantages of being a long rod, having a nematic phase, and forming a stable glass, while, at the same time, eliminating the rod movement limitations that prevented a high $\chi^{(2)}$ response in PBLG melts.

BRIEF DESCRIPTION OF THE DRAWING

The accompanying

DEFINITION OF TERMS

Figure 1:
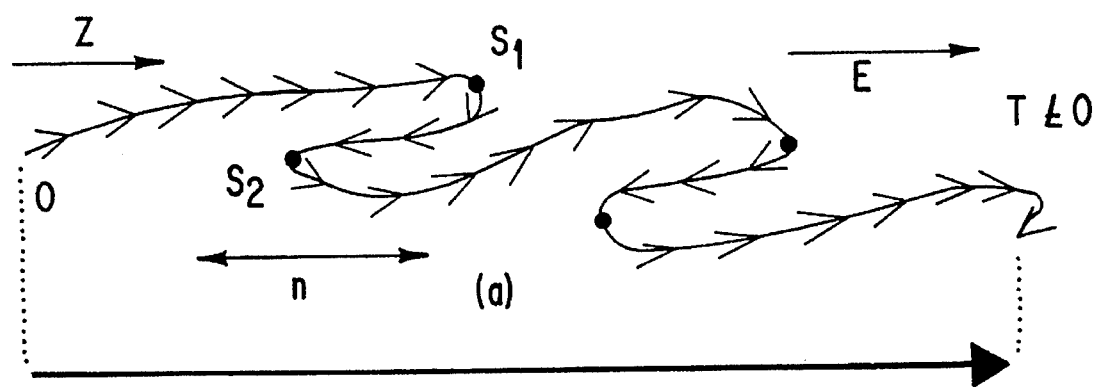
FIG. 1 is a schematic representation of a polymeric structure embodying the present invention.

The term "nematic" is here used to mean both truly nematic materials (see above) and also smectic materials (materials having a smectic phase show the orientational order of nematics but with an additional positional ordering into layers superimposed one on another; it is only the orientational aspect that contributes here to the achievement of dipolar order in a poling field, and thus the effect is also present in smectics).

The term "semi-flexibility" as used herein refers to the ability of the main-chain polymer to bend at selected sites along its length. This is discussed further hereinafter.

The term "stereo-regular, like-orientated", as used herein, refers to all the dipolar elements pointing in the same direction along the chain in each monomer unit, and to all the NLO elements pointing in the same direction along the chain in each monomer unit, so there is both a net inboard dipole and a hyperpolarability $\beta$.

DETAILED DESCRIPTION OF THE INVENTION

Various aspects of the invention are now described in more detail with reference to the accompanying Formulae.

Formula I is an example of an aromatic ester, and Formulae II and III are examples of materials possessing certain characteristics required in a worm (main-chain) polymer before it will satisfy the needs of the invention.

Formula IV illustrates an effective non-linear dielectric element. Formulae V and VI illustrate worm polymers which exhibit very large dielectric and optical changes in the presence of an electric field, and equivalently large non-linear optical effects.

The large response to poling fields

FIG. 1 illustrates a well-ordered nematic polymer (ordering direction n). It is semi-flexible, displaying wiggles and occasional abrupt changes of direction (the "hair-pin" defects labelled $S_1$, $S_2$, . . . ), these characteristics being thermally induced—that is, they are the effect of temperature. This is in strong contrast to nematic rigid rods such as PBLG which, being unbending, act as a coherent whole (one direction defining the whole). Dipoles, denoted by the small arrowheads, point along the chain in the same sense from monomer unit to monomer unit. The chain turns over (at the hairpins), oppositely-directed sections of chain having a nugatory contribution. Hence, though the net number of dipoles along E is not the total number (N, the degree of polymerisation), nevertheless it is still a large number related to the net size of the chain, and denoted by the large arrow-headed line. This net number can be thought of as giving the chain as a whole a very large dipole, leading to enormously efficient poling. The nematic field has created this shape, in an otherwise semi-flexible polymer, by restricting the chain direction to being up or down the direction n (the ordering direction, or "director") even before E is applied, E acting only on the dipole part-of the problem. Thus, the nematic field induces large sections of the chain, and hence large numbers of dipoles along the chain, to act cooperatively. This represents a new and more subtle use of the nematic field, going well beyond that disclosed in the prior art.

The large NLO response (often referred to as the "$\chi^{(2)}$ value") now follows from the bias that has been created. Since the invention specifies that the D-A pairs (in other words, the NLO elements, "$\beta$ units" or the dye elements) must also point in the same direction along the chain, they too are in up/down imbalance, and an NLO response in the medium as a whole is set up. Since the imbalance is large, so too is the NLO response.

The bias created by a poling field applied to main chain PLCs of this geometry was considered by J M F Gunn and M Warner, Phys. Rev. Lett. 56 1268 (1986), though they confined themselves to the setting up of dipolar order, and did not consider (or discuss) any NLO response. This publication gives the detailed theory of how dipolar order (up/down imbalance) is set up. However, the basic idea behind this is simple, and is that the polarisation P, the net number of up-dipoles per unit volume, is given by the expression $$P = \chi^{(1)} E_{poling} = \frac{\mu^2}{K_S T v} E_{poling}$$

where $\mu$ is the dipole moment per molecule, $K_S$ is Boltzmann's constant, and $v$ is the molecular volume. If $\mu$ and $v$ are the values per monomer (values of short molecules or, say, of the teeth in the conventional comb PLCs), then the value of P for a material composed of rod of N monomers each pointing the same way along rods would be $$P = \chi^{(1)}_{rod} E_{poling} = N \frac{\mu^2}{K_S T v} E_{poling} = N \chi^{(1)}_{monomer} E_{poling}$$

In other words, the ability to form dipolar order P in response to $E_{poling}$—that is, $\chi^{(1)}$—is effectively N times larger in fluids composed of long rods than in ordinary fluids where the dipoles effectively act independently of each other. This was the motivation of Levine et al, supra.

For the present invention it is the net number of monomer dipoles per molecule—that is, the effective dipole moment per chain in the ordering direction—that is important. Here it plays the role of N in the above expression, and gives the extent of enhancement. It is the long arrow of FIG. 1 that is the dipole that enters the second expression for a rod.

When the number of thermally-created hairpins per chain is small then the net dipole moment of a chain is of order N, and the enhancement of the up/down order itself— that is, $\chi^{(1)}_{polymer}$—becomes roughly N times larger than the conventional value (details are in Gunn and Warner, supra).

Another way of understanding the connection between hairpins and the creating of bias, a way without recourse to mathematical formulae, is as follows. In FIG. 1, the applied poling field is favourable to the dipoles in the section (O, $S_1$), but unfavourable in the section ($S_1$, $S_2$), and so on. If hairpins are arranged at positions along the chain so that their net extent is the large arrow-headed lines then the chain conformation as a whole is favourable. If, instead, they were disposed such that their net extent was oppositely directed to the poling field then the chain conformation as a whole would be unfavourable—but in that case the hairpin positions would then adjust under the poling field until this was no longer so. This adjustment to net favourability is the setting up of the up/down imbalance—that is, of the poling. Because the molecule is large, the net dipole, whaler it be up or down, is also large, and hence the bias achievable by the field is large as well.

These results translation into the same enhancement factors for $\chi^{(2)}$, namely it becomes a factor of order N ultimately larger than the response of a fluid made of comparable monomers or of the known simple side-chain PLCs. It should be emphasised that N can be up to several hundred for a really long chain poller. N has been measured by neutron scattering from the polymer in Formula II. Hairpins have been observed, and the effective N is seen as the enhancement of the chain size beyond its value in the non-nematic state. This is the precise sense of idea of "high" NLO response.

Rapidity of creation of dipolar order by the poling field

Having found an alternative to a rigid rod to achieve huge poling, there is at the same time avoided the limitation associated with such a rod, namely the immobility of the rod molecules to up/down exchange when E is applied to the bulk liquid phase when in a concentrated or melt form. Because semi-flexible polymers have internal freedom, reversal no longer has to be achieved by rotating the whole molecule around (as is necessary for a rigid rod molecule). The chain direction (as defined by the direction of the net number of dipole elements) with respect to E can be reversed by, as it were, passing the hairpins along the chain. In other words, where it can the wrongly orientated chain link adjacent the hairpin will turn around so that it is now aligned with the neighbouring link with which it originally formed the hairpin, and will then form the hairpin with the next unaligned link. And then that link turns around . . . and so on (in practice each hairpin bend is, as implied by FIG. 1, comprised of several links each bending the molecule round a little further than the preceding one, but the overall effect is the same). There is no nematic barrier to this motion, in contrast to that mentioned in the discussion of the disadvantages of rigid rods, and this can most simply be seen by considering a chain with only one hairpin in it. As the hairpin moves from being near one end to being near the other, the chain—in the sense given by the dipole-element arrows in it—turns over.

The advantages gained from nematic phases and polymeric ease of glass formation are retained. Since in the glass large scale motions of the chain are frozen, the up/down bias created by poling becomes permanent. This is because only by large scale motion can the component dipoles in a chain to be turned over, as the simple one-hairpin example above shows.

Specification of molecular requirements

A semi-flexible main chain is obtained by linking the individual units—that is, the nematic-forming elements which themselves carry the permanent dipoles and the dy units—along the back-bone by bonds of a variety that allow the molecule to twist and flex thereabound. Typical bonds having the required property are those of aliphatic groups, i.e. a series of methylene groups, $-(CH_2)_x-$, that can both flex (where x is large) and can twist (about each individual C—C bond). A typical such system is seen in the material of Formula II, see Blumstein et al, Molec. Cryst. Liquid Cryst. 82 205 (1982), though it should be observed that the particular compound disclosed there, poly(2,2'-methyl-4,4'-oxyazoxybenzenedodecanedioyl), generally known as DDA, is not in fact a compound of the invention, for it has its dipoles arranged with opposite sense in pairs yielding no overall contribution to poling efficiency, and is thus undesirable.

A popular main chain PLC is the p-phenylene polyamide of Formula III. Note that it lacks the vital element of a semi-flexible backbone, and so ie not a polymer of the invention.

In general, semi-flexible nematic main chain polymers can be obtained by the sequential attachment of aliphatic/aromatic poly(imides) and poly(esters) and their combinations.

Dipoles having a net sense in one direction from monomer to monomer are obtained, for example, by p-phenylene polyamide structures of Formula III. This conforms to the stereo-regular condition in that the dipoles add coherently along the polymer main chain.

Both semi-flexibility and dipole and NLO coherence are found in the nematic polymer of Formula V (a compound of the invention). Another compound of the invention is of Formula VI. They have all the requirements specified above.

A good β value, the intrinsic NLO property of a monomer, is obtained from Donor-Acceptor pairs arranged coherently along the molecule. A classic example, dimethylaminonitrostilbene (commonly known as DANS) is shown in Formula IVa. It is a conventional NLO dye, the D and A (marked in the FIGURE) being separated by a conjugated bridge that is a part of the molecule that conducts charge from Donor to Acceptor.

Various good D-A pairs are listed with the Formulae.

The following Examples illustrate the invention.

EXAMPLE 1

The material shown in Formula V, may be synthesised (according to the scheme shown in Chart A) in the following successive synthesis steps.

Step 1: Preparation of the compound of Formula A

Sodium metal (0.23 g, 0.01 mol) and dry ethanol (5 cm$^3$) were mixed in a dry, 25 cm flask equipped with double surface condenser. After the sodium had completely dissolved, a solution of 4-hydroxybenzylcyanine (1.33 g, 0.01 mol) in absolute ethanol (5 cm$^3$) was added with stirring, followed by 11-bromoundecan-1-ol (3.76 g, 0.015 mol). Once the addition was complete, the reaction mixture was refluxed for 6 hours. Ethanol was removed by rotary evaporation, ether (50 cm$^3$) was added to the residue, and the resulting solution was washed with 10% aqueous sodium hydroxide solution (3×5 cm$^3$), aqueous sulphuric acid solution (1M, 3×5 cm$^3$) and water (3×10 cm$^3$). Evaporation of the dried (magnesium sulphate) ether solution gave the crude product, which was purified by passing through a column of silica (6 cm×2 cm$^3$) using ether/ethyl acetate (7/3) as the eluent to give 2.03 g, (0.0067 mol, 69%) of the compound of Formula A as a white crystalline solid, m.p. 79° C.

Analysis: $C_{19}H_{29}NO_2$

Found: C,75.01;H,9.55;N,4,46%

Requires: C,75.25;H,9.57;N,4.62%

$M^+_{(mass\ spec)}$ 303.

ν2239 cm$^{-1}$ (C≡N).

$^1$H-NMR(CDCl$_3$), [ppm w.r.t. internal TMS] 7.3(d,2H); 6.9(d,2H), 4.0(t,2H); 3.8(s,2H); 3.7(t,2H); 2.2(s,1H); 1,4(b, 18H).

Step 2: Preparation of the compound of Formula B

4-Carboxybenzaldehyde (2 g, 0.013 mol) was added to a solution of sodium (0.026 mol) in absolute ethanol (25 cm$^3$). 4 g (0.013 mol) of the Formula A product of Step 1 was added, and the resulting mixture was stirred (magnetic follower) under a nitrogen atmosphere for 3 days. The mixture was poured into aqueous hydrochloric acid solution (0.1M, 2000 cm$^3$), and the solid which precipitated was recovered by filtration, washed with acetone (5×5 cm$^3$), and dried in vacuo (20C/10$^{-2}$ mbar) to give the compound of Formula B, another white crystalline solid (4.32 g, 0.01 mol, 72%). This product was found to melt into a liquid crystalline phase at 127° C.

Anaysis: $C_{27}H_{33}NO_4$

Found: C, 74.48; H, 7.76; N, 2.95%

Requires: C, 74.48; H, 7.58; N, 3.20%

ν2215 cm$^{-1}$ (C≡N); ν1685 cm$^{-1}$ (C=O); ν3600–2200 cm$^{-1}$ (H-bonding).

$^1$H-NMR (acetone-d$_8$), [ppm w.r.t. internal TMS] 8.1(d, 2M); 8.0(d,2H); 3.3(s,1H), 1.9(b, 18H).

The purity of this compound was checked by HPLC. A single narrow peak was displayed.

Step 3: Preparation of Formula V

A solution of the Formula B product of Step 2 (4.35 g, 0.010 mol), N,N-dicyclohexylcarbodiimide (2.06 g, 0.010 mol) and 4-pyrrolidinopyridine (0.015 g, 0.0001 mol) in dried dichloromethane (20 cm$^3$) was refluxed for 24 hours under a nitrogen atmosphere. The mixture was filtered, washed with acetone (5×100 cm$^3$), and dried in vacuo (20C/10$^{-2}$ mbar) to give the desired compound of Formula V, as a pale yellow solid.

Analysis: $(C_{27}H_{31}NO_3)_n$

Found: C, 77.89; H, 7.34; N, 3.56%

Requires: C, 77.69; H, 7.43; N, 3.36%

ν2210 cm$^{-1}$ (C≡N); ν1710 cm$^{-1}$ (C=O)

$^1$H-NMR(CDCl$_3$), [ppm w.r.t. internal TMS] 8.1 (d, 2H); 7.6(d, 2H); 7.4(s, 1H); 6.9(d, 2H); 4.3 (t, 2H); 4.0(t, 2H); 1.2(b, 18H).

Infrared spectroscopy revealed that the 1706 cm$^{-1}$ carbonyl band of the acid monomer disappeared on polymerisation, giving rise to a new ester carbonyl absorption at 1716 cm$^{-1}$, and the extensive hydrogen-bonded— OH absorptions between 3600 and 2400 cm$^{-1}$ observed in the monomer spectrum were absent in the spectrum of the polymer. By contrast, absorption bands associated with structural features such as methylene (5980 to 2850 cm$^{-1}$) and nitrile stretch (2218 cm$^{-1}$) experienced only minor shifts (which lie within the resolution limits of the instrument used).

The major difference between the $^1$H NMR spectrum of the monomer as compared to that of the polymer was the disappearance of the C$\underline{H}_2$—OH resonance at 3.5 ppm and the appearance of a new triplet due to —CO$_2$CH$_2$— at 4.3 ppm. All the other spectral features were unaffected on polymerisation.

Comparison of the electronic absorption spectrum of the monomer with that of the polymer revealed a slight shift in the position of the π-π* absorption maximum (from 322 to 337 nm). This may be a consequence of the difference in electron-accepting power between the acid and ester group.

A combination of differential scanning calorimetry (DSC) and optical microscopy investigations demonstrated that the monomer crystals undergo a liquid-crystal phase transition at 160° C. to a nematic phase. The clearing point is at 221° C.

The polymer also exhibited liquid-crystal mesophases. Under the polarising microscope, a transition from the solid to a highly birefringent liquid-crystalline phase took place at 96° C. The observed texture remained unchanged until a second transition occurred at 141° C., when the polymer film appeared to adopt an isotropic texture. This texture was retained until the polymer began to degrade at about 260° C. It was found that, on slow cooling from 250° C. (<10° C. min$^{-1}$), these texture changes could be reversed. The low scattering, apparent isotropic texture was maintained when the sample was cooled at rates greater than 40° C. min$^{-1}$.

Thin polymer films were subjected to electrical poling using the procedure described by S. J. Martin et al, in Hann et al (eds.) "Organic Materials for Nonlinear Optics, Vol. III, The Royal society of chemistry, London, U.K. The films also exhibited an apparent isotropic texture which could be "frozen" by cooling at rates greater than 40° C. min$^{-1}$. DSC and thermogravimetric analysis results were consistent with these findings.

SALS (small angle light scattering) tests were also done. Prior to SALS experiments, the polymer sample under study was heated (40° C. min$^{-1}$) to 220° C., the highest temperature at which the sample was stable for up to 10 min. A little pressure was applied in order to facilitate the formation of a film which was thin enough to allow at least 80% of the incident light through the sample. The polymer sample was cooled to 150° C., annealed at this temperature for 45 min and finally cooled to room temperature at 40° C. min$^{-1}$. The SALS experiments showed the variation of the overall depolarised scattered light intensity profile as a function of temperature for one such sample heated to 260° C. at 10° C. min$^{-1}$ and then cooled at the sample rate. The low depolarised light intensity observed from room temperature up to 220° C. is indicative of a highly monotropic system. This suggests that the annealing process at 150° C. for 45 min and the subsequent cooling to room temperature at 40° C. min$^{-1}$ had effectively "frozen in" this well-ordered structure. Upon subsequent heating to 260° C., an increase in depolarised scattering intensity to levels normally observed with liquid-crystalline materials took place. Further heating/cooling runs to 260° C. produced vertical scattering profiles. Thin films prepared two months prior to the SALS experiments and stored at room temperature exhibited identical behaviour, indicating that these samples do not reorganise significantly on storage.

Wide-angle X-ray scattering (WAXS) experiments were also conducted. The WAXS profile of a polymer film treated according to the protocol adopted for the SALS experiments exhibited a broad peak at 2θ=11.740 (d-spacings=7.532Å) and an "amorphous halo" at a large angle. The observed d-spacing is consistent with the structure assigned on the basis of the SALS and optical microscopy experiments. It may be attributed to the intermolecular distance between the centres of gravity of neighbouring cyanostilbene chromophores.

The linear electro-optic (Pockel's) effect associated with these structures was measured with a HeNs laser using the crossed polariser technique described by Martin et al, supra. Measurements were carried out on films subject to electrical poling quenched from the uniaxial monotropic phase (prepared in a manner identical to that used for SALS experiments). They showed a Pockel's effect. Since this effect can only be observed on samples possessing a non-centrosymmetric arrangement of dipoles it is concluded that a statistically parallel alignment of the dipoles predominates. The formation of hydrogen-bonded molecular arrays due to adjacent carbonyl of hydroxy end groups and/or interactions between these end groups and the substrate may be responsible for this behaviour.

EXAMPLE 2

Following a procedure analogous to that of Example 1, the poller of Formula VI was prepared (m. wt. c.7,000). The effect of U(dc) was analysed on a thin film of this polymer, i.e. by determining I(ac)/I(dc) [=δI/I (without AC field)] with respect to U(ac)/V. Results were obtained that are analogous to those showing Pockel's effect, in Example 1.

At 120° C., the I(ac)/I(dc) value rose linearly from zero to c.2.0×10$^{-4}$ at U(ac)/V=1.5 under an applied voltage of 1.8 V. At 130° C., the respective values were zero and c. 2.6×10$^{-4}$.

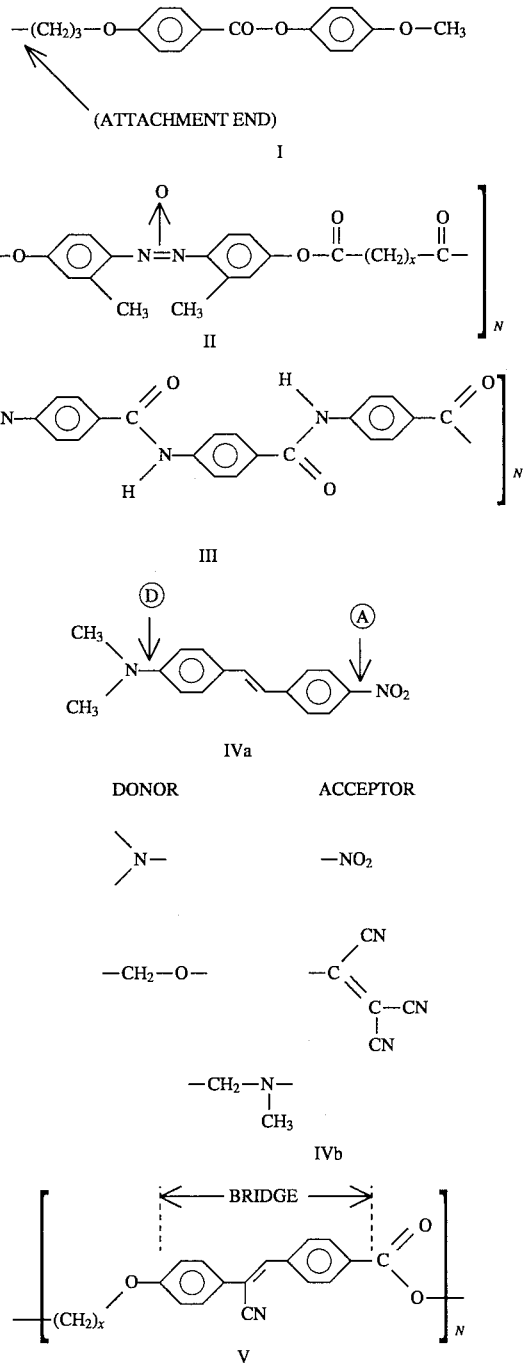

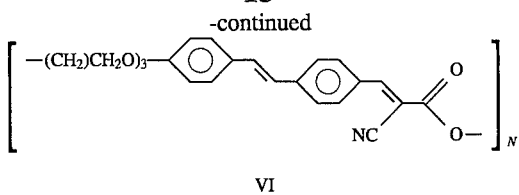

VI

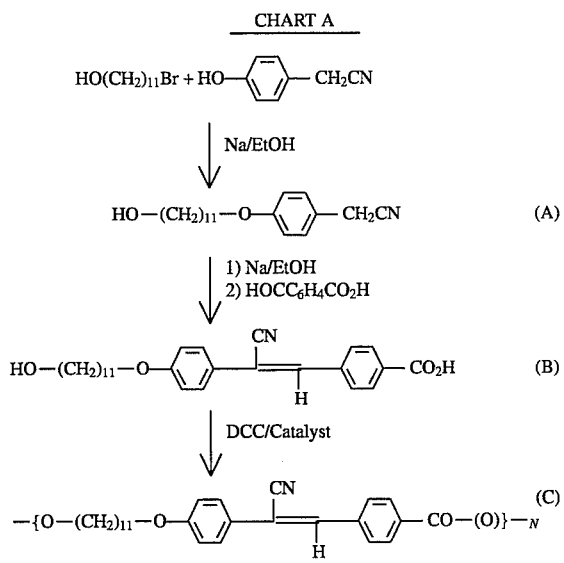

CHART A

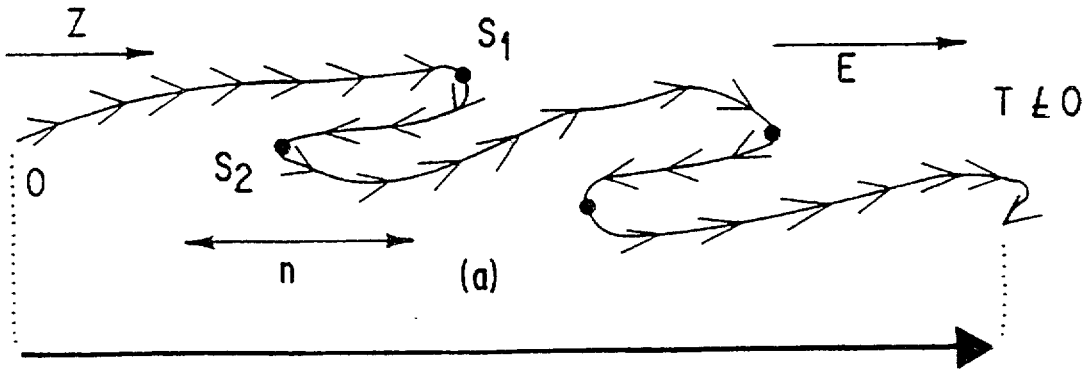

What I claim is:

1. A main-chain polymeric nematic liquid crystal material having both a non-linear optical (NLO) response and poling orderability, comprising:
a semi-flexible polymeric backbone and stereo-regular, like-oriented elements incorporated in said polymer backbone, said elements comprising:
(a) a plurality of NLO elements, and
(b) dipolar elements,
wherein the like orientation of said elements is capable of being retained and reversed by migration of dipole-reversing molecular defects along said polymer backbone.

2. The main-chain polymeric nematic liquid crystal material according to claim 1, wherein said polymer backbone is an aliphatic or aromatic polyamide, polyimide or polyester.

3. The main-chain polymeric nematic liquid crystal material according to claim 1, wherein said NLO elements comprise donor/acceptor pairs, wherein said pairs each include components separated by a conjugated bond bridge.

4. The main-chain polymeric nematic liquid crystal according to claim 1, wherein said polymer backbone comprises aliphatic linkages.

5. The main-chain polymeric nematic liquid crystal according to claim 1, wherein said polymer backbone is derived from monomers that include an NLO element.

6. The main-chain polymeric nematic liquid crystal material according to claim 5, wherein said monomers are dipolar.

7. The main-chain polymeric nematic liquid crystal material according to claim 1, wherein said material is capable at the same time of a) a high NLO response and b) rapid ordering when exposed to a poling field.

8. A main-chain polymeric nematic liquid crystal material having both a non-linear optical (NLO) response and poling orderability comprising:
(a) a semi-flexible polymer backbone comprising monomers connected with semi-flexible connections;
(b) each of said monomers comprising:
a net dipole moment that always points in the same direction along the polymer backbone, and
a donor/acceptor pair;
said donor/acceptor pair having a donor component separated from an acceptor component such that each of said monomers has a molecular non-linear dielectric susceptibility that always points in the same direction along said polymer backbone.

9. The main-chain polymeric nematic liquid crystal material according to claim 8, wherein said polymer backbone is an aliphatic or aromatic polyamide, polyimide or polyester.

10. The main-chain polymeric nematic liquid crystal material according to claim 8, wherein said components of said donor/acceptor pair are separated by a conjugated bond bridge.

11. The main-chain polymeric nematic liquid crystal according to claim 8, wherein said polymer backbone comprises aliphatic linkages.

12. The main-chain polymeric nematic liquid crystal according to claim 8, wherein said material is capable at the same time of a) a high NLO response and b) rapid ordering when exposed to a poling field.

* * * * *

UNITED STATES PATENT AND TRADEMARK OFFICE
CERTIFICATE OF CORRECTION

PATENT NO. : 5,484,550
DATED : January 16, 1996
INVENTOR(S) : Mark Warner

It is certified that error appears in the above-indentified patent and that said Letters Patent is hereby corrected as shown below:

The title page, should be deleted, to appear as per attached title page.

On the title page, item [63]: should read -- Continuation-in-part of Ser. No 689,797, May 21, 1991, abandoned, which was the national stage of internationa application number PCT/GB89/01415, filed November 24, 1989.

Signed and Sealed this

Tenth Day of September, 1996

Attest:

BRUCE LEHMAN

Attesting Officer     Commissioner of Patents and Trademarks

United States Patent [19]
Warner

[11] Patent Number: 5,484,550
[45] Date of Patent: Jan. 16, 1996

[54] MATERIALS EXHIBITING LARGE NON-LINEAR OPTICAL PROPERTIES

[75] Inventors: Mark Warner, Cambridge, England

[73] Assignee: Non-Linear Optics Limited, Jersey, Channel Islands

[21] Appl. No.: 202,547

[22] Filed: Feb. 28, 1994

Related U. S. Application Data

[63] Continuation-in-part of Ser. No. 689,797, May 21, 1991, abandoned, which was the national stage of international application number PCT/GB89/01415, filed November 24, 1989.

[30] Foreign Application Priority Data

Nov. 26, 1988 [GB] United Kingdom .............. 8827664

[51] Int. Cl.$^6$ ..................................... C09K 19/52
[52] U.S. Cl. ................. 252/299.01; 252/582; 428/1
[58] Field of Search ..................... 252/582, 299.01; 428/1

[56] References Cited

U.S. PATENT DOCUMENTS

| | | | |
|---|---|---|---|
| 4,694,066 | 9/1987 | DeMartino et al. | 252/299.01 |
| 4,779,961 | 10/1988 | DeMartino | 252/299.01 |
| 4,795,664 | 1/1989 | DeMartino | 252/299.01 |
| 4,810,338 | 3/1989 | DeMartino et al. | 252/299.01 |
| 4,835,235 | 5/1989 | DeMartino et al. | 252/299.01 |
| 4,851,502 | 7/1989 | DeMartino | 252/299.01 |
| 4,887,889 | 12/1989 | Leslie | 252/582 |
| 4,894,263 | 1/1990 | DuBois et al. | 252/299.01 |
| 5,002,361 | 3/1991 | DeMartino et al. | 252/582 |
| 5,011,623 | 4/1991 | Yoshinaga et al. | 252/299.01 |
| 5,026,147 | 6/1991 | Soane et al. | 252/582 |
| 5,037,582 | 8/1991 | Miyata et al. | 252/582 |
| 5,053,168 | 10/1991 | Man et al. | 252/299.01 |
| 5,080,764 | 1/1992 | Kester et al. | 252/582 |
| 5,098,975 | 3/1992 | Omelis et al. | 252/299.01 |
| 5,273,793 | 12/1993 | Kester et al. | 252/299.01 |

OTHER PUBLICATIONS

Levine et al., The Journal of Chemical Physics, vol. 65, No. 5, pp. 1989–1993, (1976).
J. M. F. Gunn and M. Warner, "Layer Hopping by Chains in Polymeric Smectics?", Physical Review Letters, vol. 56, No. 12, Mar. 24, 1986, pp. 1268–1271.
Blumenstein et al., "Influence of Molecular Weight on Phase Transition Entropies of a Thermotropic Nematic Polyester", Mol. Cryst. Lip. Cryst., vol. 82, pp. 205–213 (1982).
B. F. Levine et al., "Second order hyperpolarizability of a polypeptide α-helix Poly-γ-benzyl-L-glutamate", The Journal of Chemical Physics, vol. 65, No. 5, Sep. 1, 1976, pp. 1989–1993.

*Primary Examiner*—Philip Tucker
*Attorney, Agent, or Firm*—Oliff & Berridge

[57] ABSTRACT

A polymeric nomadic liquid crystal material has both a non-linear optical (NLO) response and also poling orderability, said material having semi-flexibility along the polymer backbone and stereo-regular, like-orientated incorporation in the polymer backbone of (a) a plurality of NLO elements and (b) dipolar elements, wherein the like orientation can be retained, and reversed by an applied poling field, by migration of dipole-reversing molecular defects along the backbone.

12 Claims, 1 Drawing Sheet